US011163845B2

(12) United States Patent
Liu et al.

(10) Patent No.: US 11,163,845 B2
(45) Date of Patent: Nov. 2, 2021

(54) POSITION DEBIASING USING INVERSE PROPENSITY WEIGHT IN MACHINE-LEARNED MODEL

(71) Applicant: Microsoft Technology Licensing, LLC, Redmond, WA (US)

(72) Inventors: Dan Liu, Santa Clara, CA (US); Daniel Sairom Krishnan Hewlett, Sunnyvale, CA (US); Qi Guo, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 16/449,135

(22) Filed: Jun. 21, 2019

(65) Prior Publication Data

US 2020/0401643 A1 Dec. 24, 2020

(51) Int. Cl.
*G06F 7/00* (2006.01)
*G06F 16/9538* (2019.01)
*G06F 16/906* (2019.01)
*G06N 3/04* (2006.01)

(52) U.S. Cl.
CPC ........ *G06F 16/9538* (2019.01); *G06F 16/906* (2019.01); *G06N 3/0472* (2013.01)

(58) Field of Classification Search
CPC . G06F 16/9538; G06F 16/906; G06N 3/0472; G06N 3/084; G06N 5/022; G06N 3/0454
See application file for complete search history.

(56) References Cited

U.S. PATENT DOCUMENTS

| 8,060,456 | B2 | 11/2011 | Gao et al. |
|---|---|---|---|
| 9,607,077 | B2 | 3/2017 | Li et al. |
| 10,277,715 | B1 | 4/2019 | Yan |
| 10,303,681 | B2 | 5/2019 | Noh et al. |
| 11,003,720 | B1 | 5/2021 | Xia et al. |
| 2008/0195601 | A1* | 8/2008 | Ntoulas ................. G06F 16/313 |
| 2008/0225870 | A1 | 9/2008 | Sundstrom et al. |
| 2009/0177599 | A1* | 7/2009 | Bhaskar ................. G06N 3/126 706/13 |

(Continued)

OTHER PUBLICATIONS

"Non Final Office Action Issued in U.S. Appl. No. 16/449,110", dated May 21, 2021, 33 Pages.

*Primary Examiner* — Mohammed R Uddin
(74) *Attorney, Agent, or Firm* — Schwegman Lundberg & Woessner, P.A.

(57) ABSTRACT

In an example embodiment, position bias is addressed by introducing an inverse propensity weight into a loss function used to train a machine-learned model. This inverse propensity weight essentially increases the weight of candidates in the training data that were presented lower in a list of candidates. This achieves the benefit of counteracting the position bias and increases the effectiveness of the machine-learned model in generating scores for future candidates. In a further example embodiment, a function is generated for the inverse propensity weight based on responses to contact requests from recruiters. In other words, while the machine learned-model may factor in both the likelihood that a recruiter will want to contact a candidate and the likelihood that a candidate will respond to such a contact, the function generated for the inverse propensity weight will be based only on training data where the candidate actually responded to a contact.

20 Claims, 14 Drawing Sheets

(56) References Cited

U.S. PATENT DOCUMENTS

| | | |
|---|---|---|
| 2010/0082510 A1 | 4/2010 | Gao |
| 2013/0159219 A1 | 6/2013 | Pantel et al. |
| 2015/0006286 A1* | 1/2015 | Liu .................. G06Q 30/0269 |
| | | 705/14.53 |
| 2017/0039483 A1 | 2/2017 | Cheng et al. |
| 2017/0068992 A1* | 3/2017 | Chen ................. G06Q 30/0269 |
| 2017/0178031 A1* | 6/2017 | Zhu ....................... G06F 16/951 |
| 2017/0308609 A1* | 10/2017 | Berkhin ............... G06F 16/282 |
| 2017/0308806 A1* | 10/2017 | Chao ................ G06F 16/24578 |
| 2018/0084078 A1 | 3/2018 | Yan |
| 2018/0137857 A1 | 5/2018 | Zhou et al. |
| 2018/0150464 A1 | 5/2018 | Ma et al. |
| 2018/0285957 A1* | 10/2018 | Ng .......................... G06N 5/003 |
| 2019/0005409 A1 | 1/2019 | Doshi et al. |
| 2019/0019157 A1 | 1/2019 | Saha et al. |
| 2019/0034792 A1 | 1/2019 | Kataria et al. |
| 2019/0050813 A1* | 2/2019 | Guo ....................... G06N 20/00 |
| 2019/0052720 A1 | 2/2019 | Guo et al. |
| 2019/0102395 A1 | 4/2019 | Kshetramade |
| 2019/0187955 A1 | 6/2019 | Green |
| 2019/0205905 A1* | 7/2019 | Raghunathan ....... G06N 3/0454 |
| 2019/0392082 A1 | 12/2019 | Bell et al. |
| 2020/0342252 A1 | 10/2020 | Givental et al. |
| 2020/0401594 A1 | 12/2020 | Hewlett et al. |
| 2020/0401627 A1 | 12/2020 | Liu et al. |
| 2020/0401644 A1 | 12/2020 | Hewlett et al. |

* cited by examiner

FIG. 12

POSITION DEBIASING USING INVERSE PROPENSITY WEIGHT IN MACHINE-LEARNED MODEL

TECHNICAL FIELD

The present disclosure generally relates to computer technology for solving technical challenges in machine learning. More specifically, the present disclosure relates to position debiasing using inverse propensity weight in a machine-learned model.

BACKGROUND

The rise of the Internet has given rise to two different, yet related, phenomena: the increase in the presence of social networks, with their corresponding member profiles visible to large numbers of people, and the increase in the desirability of reaching out to small groups of social network members who meet strict criteria. This is especially pronounced in the field of recruiting, where recruiters are typically attempting to find members with particular qualifications (e.g., education, experience, skills, etc.) and then generally the recruiters reach out to members with the particular qualifications to find out whether the members may be willing to apply for the job openings the recruiter has available.

Job solicitation communications, such as emails sent by recruiters to members who may be prospective job applicants, can take a lot of time on the part of the recruiters, especially if done effectively. Effective job solicitation communications generally include personalized information about the member and have the solicitation geared specifically towards that member, thus making it look less like a mass communication sent to many potential applications and more like the recruiter has specifically targeted the member. Recruiters, however, have a limited amount of time to spend in creating such job solicitation communications, and thus would benefit greatly if mechanisms were in place to reduce the likelihood that such time would be wasted. A technical problem arises in determining whether a particular member, gauged from information available to a computer system, is likely to respond to a particular communication and, even if such a determination were feasible, how to utilize such information to reduce wasted resources. Additionally, a recruiter would also benefit if he or she were presented with candidate results of candidates that the recruiter is likely to want to contact. Another technical problem arises in determining whether a particular recruiter is likely to want to contact a particular member.

One way to address these problems is to create a machine-learned model that produces, for a given candidate, a score indicative of both the probability that a recruiter will want to contact the candidate and that the candidate will respond to such a contact. The scores for multiple candidates may then be used to rank the candidates to determine an ordering in which to display the candidates for a recruiter. However, a technical issue that arises with the use of such machine-learned models is position bias. Specifically, training data supplied for training the machine-learned model using a machine learning algorithm may introduce a bias into the training that may produce inaccurate scores. This bias is caused by the propensity of humans to favor items that are presented higher up in a list. This causes recruiters to be more likely to contact candidates who have been presented to them higher up in a list, and thus the training data, which is often pulled from actual past recruiter/candidate interactions, winds up being biased in the favor of higher ranked candidates.

BRIEF DESCRIPTION OF THE DRAWINGS

Some embodiments of the technology are illustrated, by way of example and not limitation, in the figures of the accompanying drawings.

FIG. 12 is a screen capture illustrating a graphical user interface (GUI) for displaying results of the ranking performed in FIG. 8.

DETAILED DESCRIPTION

Overview

In an example embodiment, position bias is addressed by introducing an inverse propensity weight into a loss function used to train a machine-learned model. This inverse propensity weight essentially increases the weight of candidates in the training data that were presented lower in a list of candidates. This achieves the benefit of counteracting the position bias and increases the effectiveness of the machine-learned model in generating scores for future candidates.

In a further example embodiment, a function is generated for the inverse propensity weight based on responses to contact requests from recruiters. In other words, while the machine learned-model may factor in both the likelihood that a recruiter will want to contact a candidate and the likelihood that a candidate will respond to such a contact, the function generated for the inverse propensity weight will be based only on training data where the candidate actually responded to a contact.

In a further example embodiment, the function generated for the inverse propensity weight is applied only to candidates within a first preset number of candidates in a candidate list/ranking. A different function is generated for candidates after that first preset number of candidates. This different function may be a modeled curve that attempts to fit to a curve generated by the function applied to the first preset number of candidates. In another example embodiment, this different function, however, is a flat function beginning at a value generated for the inverse propensity weight for a last candidate of the first preset number of candidates.

Description

The present disclosure describes, among other things, methods, systems, and computer program products that individually provide functionality for one or more machine learning algorithm models. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Figure 1:
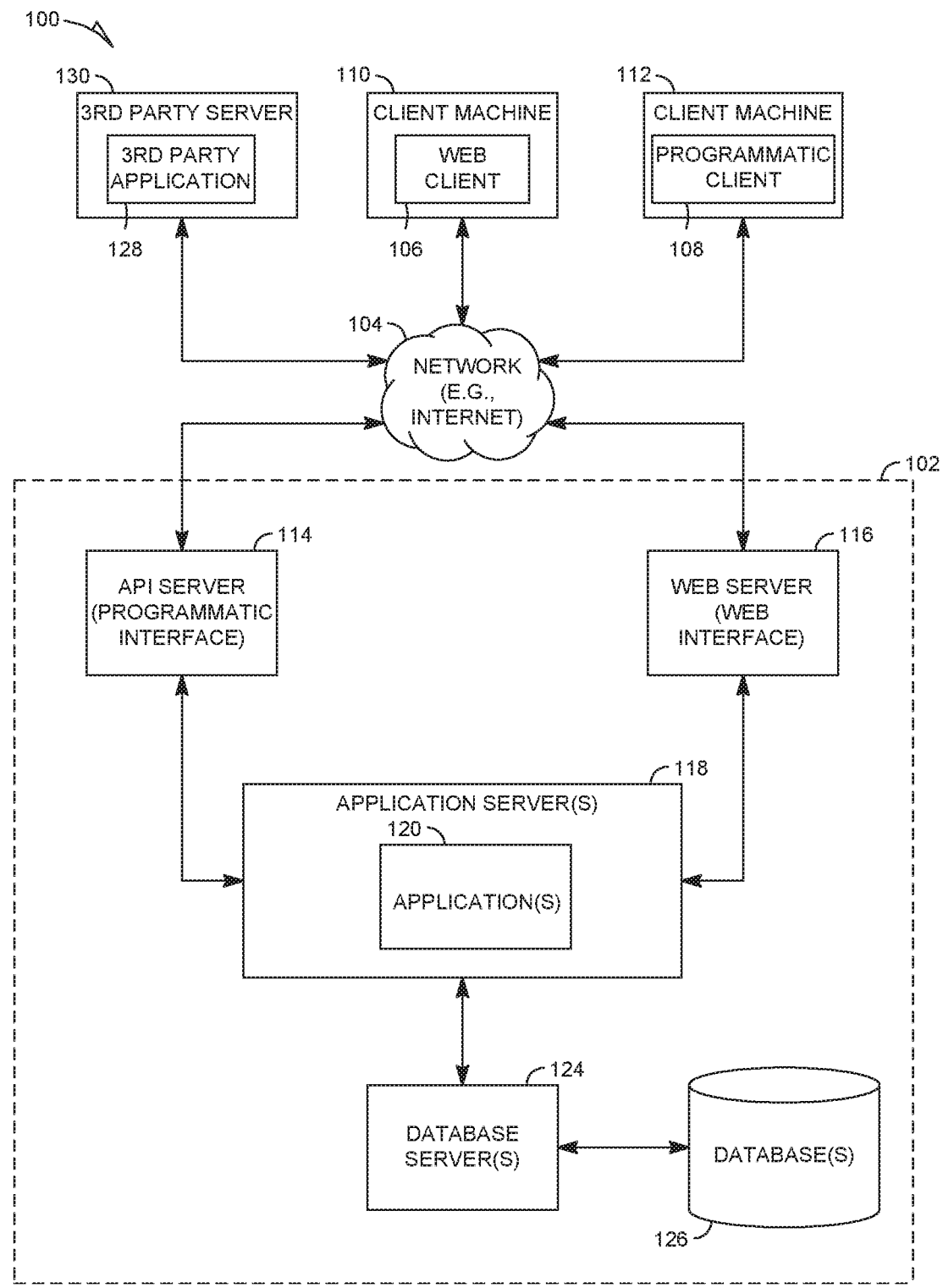
FIG. 1 is a block diagram illustrating a client-server system in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 11, 2 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
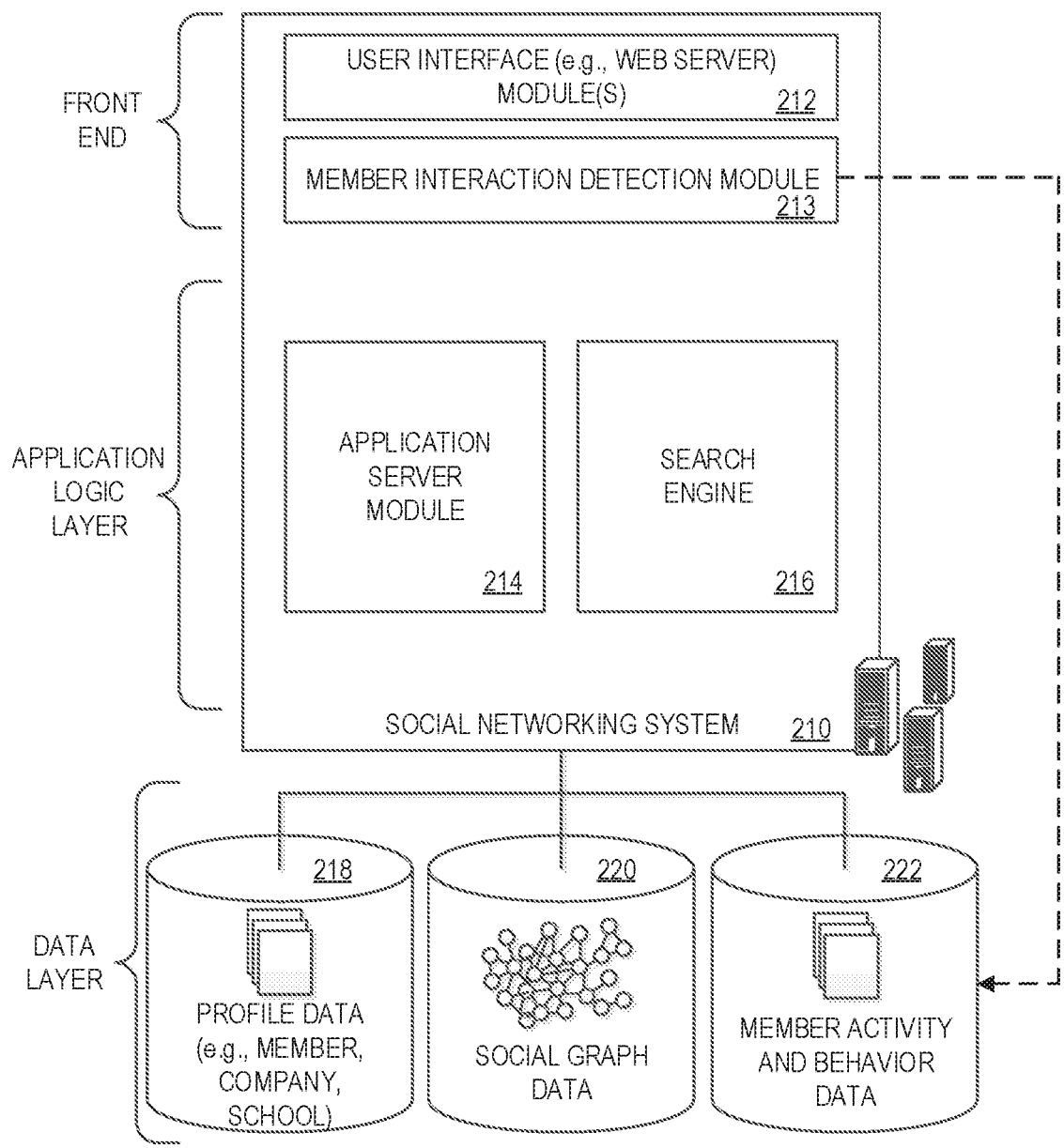
FIG. 2 is a block diagram showing the functional components of an online service, including a data processing module referred to herein as a search engine, for use in generating and providing search results for a search query, consistent with some embodiments of the present disclosure.

In some embodiments, the networked system 102 may comprise functional components of an online service. FIG. 2 is a block diagram showing the functional components of an online service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the online service.

As shown in FIG. 2, the data layer may include several databases, such as a profile database 218 for storing profile data, including both member profile data and profile data for various organizations (e.g., companies, schools, etc). Consistent with some embodiments, when a person initially registers to become a member of the online service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc. employment history, skills, professional organizations, and so on. This information is stored, for example, in the profile database 218. Once registered, a member may invite other members, or be invited by other members, to connect via the online service, A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the online service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the online service system 210 provides an API module via which applications 120 and services can access various data and services provided or maintained by the online service. For example, using an API, an application may be able to request and/or receive one or more navigation recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the online service, nothing other than data privacy concerns prevents the API from being provided to the public or to certain third parties under special arrangements, thereby making the navigation recommendations available to third party applications 128 and services.

Although the search engine 216 is referred to herein as being used in the context of an online service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the online service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
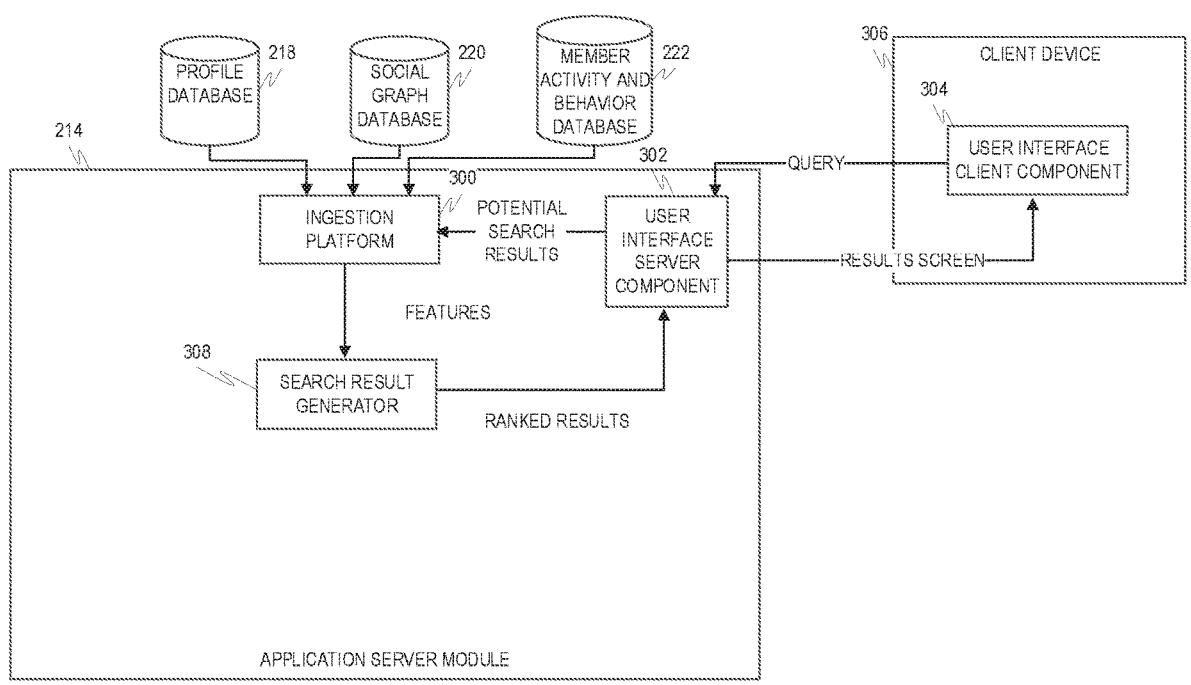
FIG. 3 is a block diagram illustrating an application server module of FIG. 2 in more detail.

FIG. 3 is a block diagram illustrating an application server module 214 of FIG. 2 in more detail. While in many embodiments the application server module 214 will contain many subcomponents used to perform various different actions within the online system, in FIG. 3 only those components that are relevant to the present disclosure are depicted. Here, an ingestion platform 300 obtains information from the profile database 218, the social graph database 220, and the member activity and behavior database 222 relevant to a query submitted by a searcher via a user interface server component 302. The user interface server component 302 communicates with a user interface client component 304 located on a client device 306 to obtain this identification information. The details of the user interface client component 304 will be described in more detail below, but generally a user, known hereafter as a searcher, of the user interface client component 304 may begin a search or otherwise cause generation of a search that provides search results of members with whom the searcher may wish to communicate. Information about each of these members is identified in the search results. The user interface server component 302 may generate potential search results based on the query and send identifications of these potential search results to the ingestion platform 300, which can use the identifications to retrieve the appropriate information corresponding to those potential search results from the profile database 218, the social graph database 220, and the member activity and behavior database 222. As will be discussed in more detail below, in some example embodiments, information about the searcher, such as a recruiter, may also be relevant to a prediction from the machine learned models described later. As such, an identification of the searcher may also be communicated via the user interface server component 302 to the ingestion platform 300, which can use the identifications to retrieve the appropriate information corresponding to the searcher from the profile database 218, the social graph database 220, and the member activity and behavior database 222.

The ingestion platform 300 may then provide the relevant information from the profile database 218, the social graph database 220, and the member activity and behavior database 222 to a search result generator 308, which acts to determine which of the potential search results to return and a ranking for those potential search results. In some example embodiments, this information is transmitted in the form of feature vectors. For example, each potential search result may have its own feature vector. In other example embodiments, the ingestion platform 300 sends raw information to the search result generator 308 and the search result generator 308 creates its own feature vectors from the raw information.

The ranked results may then be passed from the search result generator 308 to the user interface server component 302, which acts to cause the user interface client component 304 to display at least a portion of the ranked results.

Figure 4:
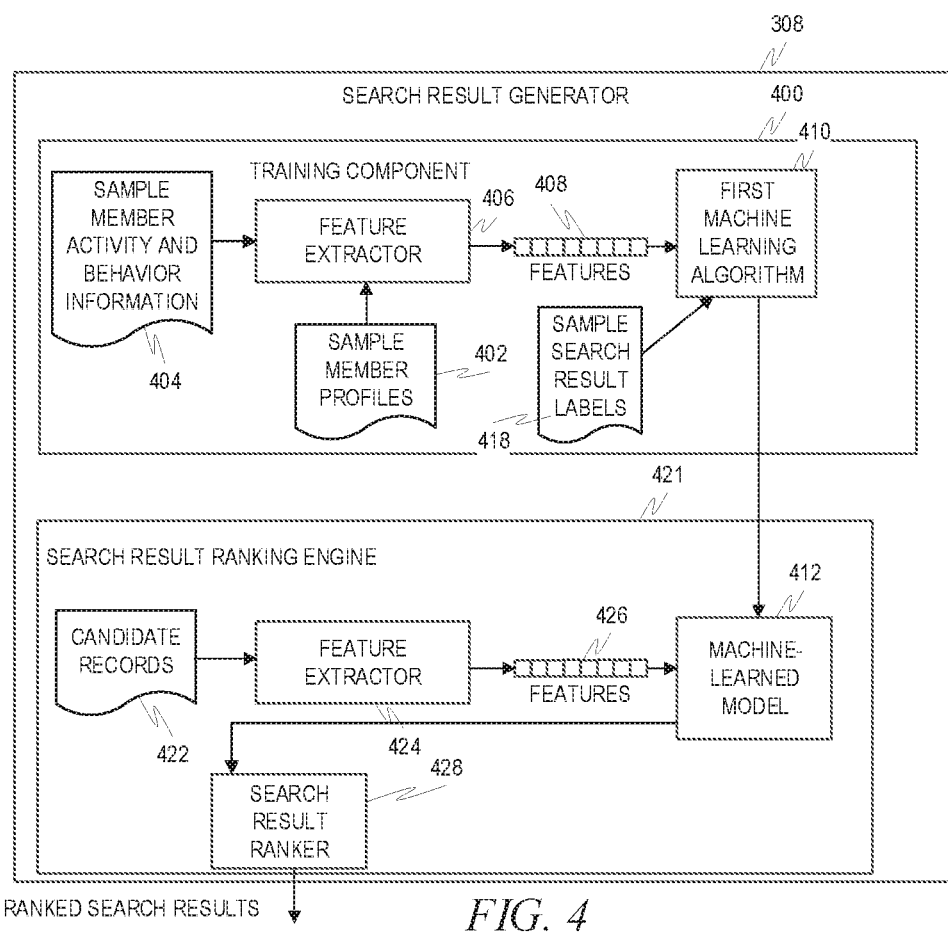
FIG. 4 is a block diagram illustrating the search result generator of FIG. 3 in more detail, in accordance with an example embodiment.

FIG. 4 is a block diagram illustrating the search result generator 308 of FIG. 3 in more detail, in accordance with an example embodiment. In a training component 400, sample member profiles 402 and sample member activity and behavior information 404 are fed to a feature extractor 406, which acts to extract curated features 408 from the sample member profiles 402 and sample member activity and behavior information 404. Different features may be extracted depending upon whether the member profile is assumed to be that of a prospective search result or that of a prospective searcher.

In an example embodiment, the curated features 408 are then used as input to a first machine learning algorithm 410 to train a machine-learned model 412 to generate a combined probability that the searcher will select the corresponding potential search result and that the member associated with the corresponding potential search result will respond to a communication from the searcher.

This training may include providing sample search result labels 418 to the first machine learning algorithm 410. Each of these sample search result labels 418 is a binary variable which indicates whether a searcher selected on the corresponding potential search result in the sample member activity and behavior information 404 and/or whether the potential search result responded to a request from the searcher.

In a search result ranking engine 421, candidate records 422 are fed to a feature extractor 424, which acts to extract curated features 426 from the candidate records 422. In some example embodiments, the candidate records 422 include member profile information and member activity and behavior information extracted by the ingestion platform 300, which can use the queries from the user interface server component 302 to retrieve the appropriate information corresponding to potential search results from the profile database 218, the social graph database 220, and the member activity and behavior database 222. The curated features 426 are then used as input to the machine-learned model 412, which outputs a score indicating the probability that the searcher will select the corresponding potential search result and the probability that a member associated with the corresponding potential search result will respond to a communication from the searcher.

This score may be passed to a search result ranker 428, which acts to rank the candidate search results based at least on these probabilities and to return the top n ranked candidate search results.

Thus, the searcher is presented with highly relevant search results based not only on the probability that the search result itself will be of interest to the searcher (based, for example, on the query itself and information about the searcher), but also that the member corresponding to the search result will respond to a communication from the searcher. Therefore, for example, a candidate who might be of extremely high interest to a recruiter but who nevertheless may have a low chance of responding to a communication from the recruiter may not be presented, in favor of a candidate who is of lower interest to the recruiter but has a higher chance of responding to a communication from the recruiter.

Turning now to the creation of the feature vectors, as described earlier, the feature vectors may be the same or may be different for the different machine learning algorithm inputs. What follows is a non-exhaustive list of various features that could be included in such feature vector(s).

In an example embodiment, the features may be divided into five classes: (1) query features, (2) result features, (3) searcher features, (4) query/result features, and (5) searcher/result features. A query feature is one that is drawn from the query itself, such as in cases where the query identifies a specific attribute of a search result, such as a first name, last name, company, or title.

A result feature is one that is drawn from the candidate result itself, such as industry, whether the candidate is considered an open candidate, a job seeker score for the candidate, a number of endorsers of the candidate query/result features, whether the candidate is an influencer, a profile quality score, whether a position or education field is empty, a number of current positions/previous positions, and educations in the search result, a communication delivery score (indicating general willingness to receive communications, as self-reported by members), a quality member score (score calculated by computing how complete a member profile is), a member engagement score, a historical click through rate for the search result from all recruiters, a historical action rate (e.g., number of all actions taken on the result divided by number of impressions of the result in the last three months), number of communications received, number of communications accepted; a decision maker score, the amount of time since the candidate indicated he or she is an open candidate, and whether the candidate has applied for a job.

A searcher feature is one that is drawn from information about the searcher him or herself, such as industry, historical rate of selection of result, and location.

A query/result feature is one that is drawn from a combination of the query and the candidate result, such as number of terms in the query that match some text in the candidate result; number of terms in the query that match specific text fields in the candidate result; the fraction of terms in the query that match some text in the candidate result; the fraction of terms in the query that match specific text fields in the candidate result; the frequency that terms in the query match some text in the candidate result; the frequency that terms in the query match specific text fields in the candidate result; if the query contains a first name and a last name and the candidate result is an influencer, then whether the candidate results matches the first name and last name; whether a position in the query matches a position in the candidate result; whether a title in the query matches a title in the candidate result; Term-Frequency-Inverse Document Frequency score; BM25F score; relative importance of matched terms with respect to query itself and the fields of the candidate result (e.g., number of matched terms$^2$/(number of terms in the query*number of terms in the field), generated affinity score created by product of query and member embeddings (similarity between search query and candidate result); raw query and candidate result matching features for schools; BM25 for current position summary divided by past position summary; clicks by candidate on advertisements from company employing searcher, if the query is a sample job posting; similarity between fields in the job posting and fields in the candidate result; similarity score between the candidate result and weighted query terms, with the weights learned online; and deep embedding features for title, skill, company, and field of study.

A searcher/result feature is one that is drawn from a combination of the searcher and the candidate result, such as network distance (social network degrees of separation between the searcher and the candidate result), number of common connections, location match, number of matching fields (e.g., current company, past company, school, industry), match score (number of matches squared divided by the product of searcher field size and result field size), recruiter-candidate affinity score (using, e.g., history data for sends and accepts between searcher and candidate result), number of common groups, and company interest score.

In an example embodiment, the machine-learned model 412 is a DCNN. A DCNN is a machine-learning model that effectively infers non-linear relationships between a homogeneous input field and desired outputs, which are either categorical classes or scalars. The DCNN is a model that maps inputs to outputs using a sequence of so-called convolutional layers of artificial neurons. The DCNN may be trained by presenting it with a large number (e.g., greater than 10,000) of sample data and labels. It is trained to minimize the discrepancy (or "loss") between the mode's output and the desired output. After the training, the model may be applied to new input images to produce a useful prediction of the professionalism levels of the new input images.

The DCNN is designed to learn not only scores for candidates, but also to learn the feature hierarchy by defining a number of layers. The process of inference involves taking a given input, applying a sequence of mathematical functions called layers, and calculating the functions on the input data. Each layer extracts features from the output of a previous layer, and all layers are trained jointly. The layer-based architecture is why it is termed a "deep" convolutional neural network.

Figure 5:
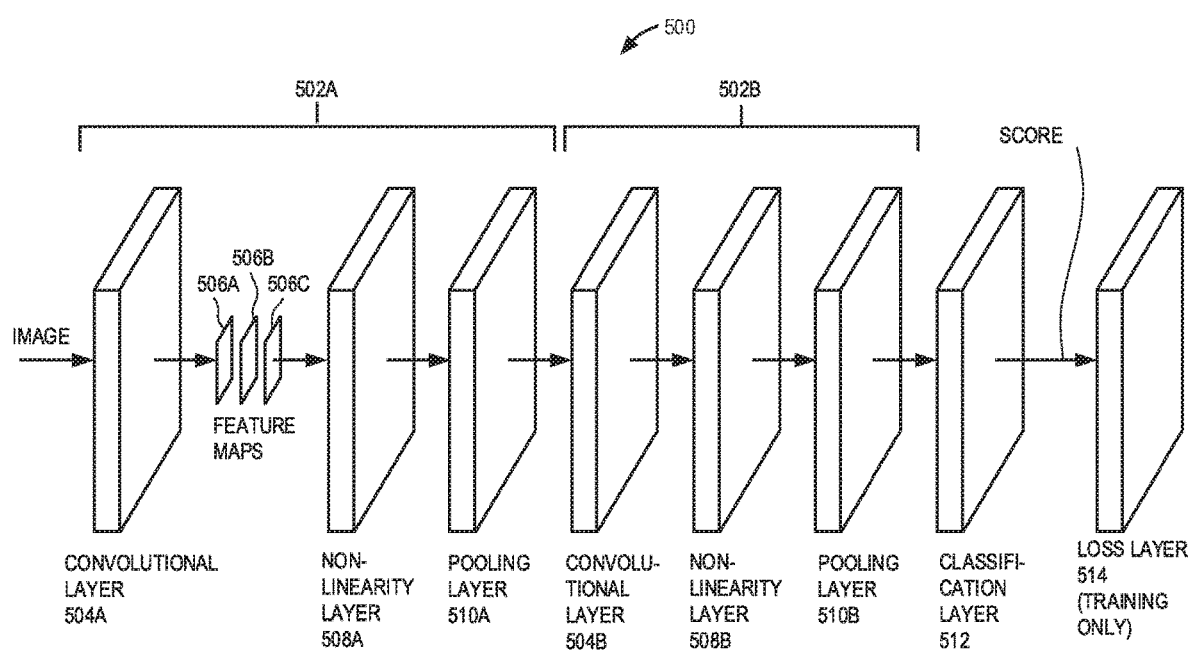
FIG. 5 is a diagram illustrating a Deep Convolutional Neural Network (DCNN), in accordance with an example embodiment.

In an example embodiment, five different types of layers are utilized. The first four layers are the convolutional layer, the nonlinearity layer, the pooling layer, and the classification layer (although the classification is just a special case of convolution followed by "softmax"). These first four layers may be considered to be a stage, and the DCNN may actually be designed to have any number of these stages. Once the stages are all complete, a loss layer is used. FIG. 5 is a diagram illustrating a DCNN 500, in accordance with an example embodiment. The DCNN 500 may be, in some example embodiments, the machine-learned model 412 of FIG. 4. Here, two stages 502A, 502B are depicted.

The convolutional layers 504A, 504B are the core of the DCNN 500. Their parameters include a set of learnable filters that have a small receptive field, but extend through the full depth of the input data. During a forward pass in a convolutional layer 504A, 504B, each filter is convolved across the features, computing the dot product between the entries of the filter and the input and producing a 2-dimensional activation map of that filter. As a result, the DCNN 500 learns filters that activate when they see some specific type of feature.

The feature maps for all filters can be stacked along the depth dimension to form the full volume output of the convolutional layers 504A, 504B.

The convolutional layers 504A, 504B apply mathematical operations called convolutionals. For two spatial dimensions and an indeterminate amount of non-spatial dimensions (referred to as "channels"), the convolutional is defined using the * operator as follows:

$$y[n, m, d] = x * f = \sum_{o} \sum_{j=-M,k=-N}^{j=M,k=N} x[n, m, o] f_d[n-k, m-j, o]$$

The convolutional layers 504A, 504B will typically have some very small support, e.g., N=1 and M=1, such that g[n, m, d]=0 if |n|>1 or |m|>1.

It should be noted that the filters used in the convolutional layers 504A 504B may be activated in a first iteration of the DCNN 500 and refined prior to each additional iteration, based on actions taken in other layers in the previous iteration, until some error term is minimized below a particular threshold. In one example embodiment, this may be accomplished through back propagation, which is described in more detail below.

The output of the convolutional layers 504A, 504B are sets of arrays called feature maps 506A-506C. Each feature map 506A-506C may be produced by a different filter and modified based on various functions in each stage. At the output, each feature map 506A-506C represents a particular feature extracted at all locations on the input and conditioned. The example in FIG. 5 is of a two-stage system, although one of ordinary skill in the art will recognize that more or fewer stages could be used while still being consistent with the present disclosure and, as will be seen in an example embodiment, the number of stages may be dynamically determined at runtime to optimize results.

Nonlinearity layers 508A, 508B give the DCNN 500 greater expressive power in uncovering nonlinear relationships between input and output. Many different nonlinearities could be used in the nonlinearity layer, including sigmoid, tan h, and rectified linear function. For brevity, one example of nonlinearity will be described here: the rectified linear function. This function is defined by the following:

$$y(x) = \begin{cases} x & \text{if } x > 0 \\ 0 & \text{if } x < 0 \end{cases}$$

Pooling layers 510A, 510B are applied to lower the input image's spatial dimensions while preserving some information from the input image. In other words, the pooling layers 510A, 510B do not actually do any of the learning, i.e., they are a fixed predefined operation that does not change as training progresses. Instead, they are used as the spatial dimensions of the problem. In one example embodiment, a decimation approach could be followed, where one out of every N samples along a spatial dimension is kept out. In another example embodiment, some local statistics may be used for pooling, such as max pooling, defined as:

$$Y[n, m, d] = \max_{|n'|<N, |m'|<M} x[n+n', m+m', d]$$

where N=M=2.

When all the stages 502A, 502B are complete, a classification layer 512 is used to classify the image using the output of the final pooling layer 510B. As stated above, the classification layer 512 is actually a specialized convolutional layer containing a filter designed to produce the score from the volume output of the final pooling layer 510B. This filter applies a classification function having weights that may be refined in the same manner as the weights in the functions of the filters of the normal convolutional layers 504, 504B.

Back propagation involves calculating a gradient of a loss function (defined later) in a loss layer 514, with respect to a number of weights in the DCNN 500. The gradient is then fed to a method that updates the weights for the next iteration of the training of the DCNN 500 in an attempt to minimize the loss function, which uses a different plurality of sample data (unless there is a need to repeat, such as running out of sample data). Back propagation uses the labeled sample data in a batch of sample data that have been passed through the stages 502A, 502B in order to calculate the loss function gradient for the samples as a group (although, as will be seen later, the loss function may be modified dynamically to eliminate some of the samples from consideration).

Back propagation may include two aspects: propagation and weight update. In the propagation aspect, forward propagation of a training pattern's input images is performed through the DCNN 500 in order to generate the propagation's output activations (i.e., the images are passed through the stages 502A, 502B). Then, backward propagation of the propagation's output activations are performed through the DCNN 502 using a target specified by the training pattern in order to generate the deltas of all output.

In the weight update aspect, for each weight of each filter, the output delta and input activation are multiplied to obtain the gradient of the weight, and then a ratio of the gradient is subtracted from the weight. The ratio influences speed and quality of learning. The higher the ratio, the faster the training, but at the expense of accuracy.

Thus, these two aspects, including both the forward pass and the backward pass through the stages 502A, 502B are performed repeatedly until error rate is below a particular threshold. An example of back propagation algorithms compatible with the DCNN 500 includes, for example, gradient descent.

The use of the back propagation may be predicated on whether or not the combined error of the classification of the images in the batch of labeled sample data transgressed a preset error threshold. If the combined error is too great, then back propagation should occur to update and hopefully minimize the error for the next iteration, and a next iteration is performed with a subsequent batch of labeled sample data, until the combined error does not transgress the threshold.

As described above, the labeled output may be scored for the data. The DCNN 500 outputs a vector that may be compared to the desired output of some loss function, such as the sum square error function:

$$\text{loss} = \sum_i (\hat{l}_i - l_i)^2$$

Figure 6:
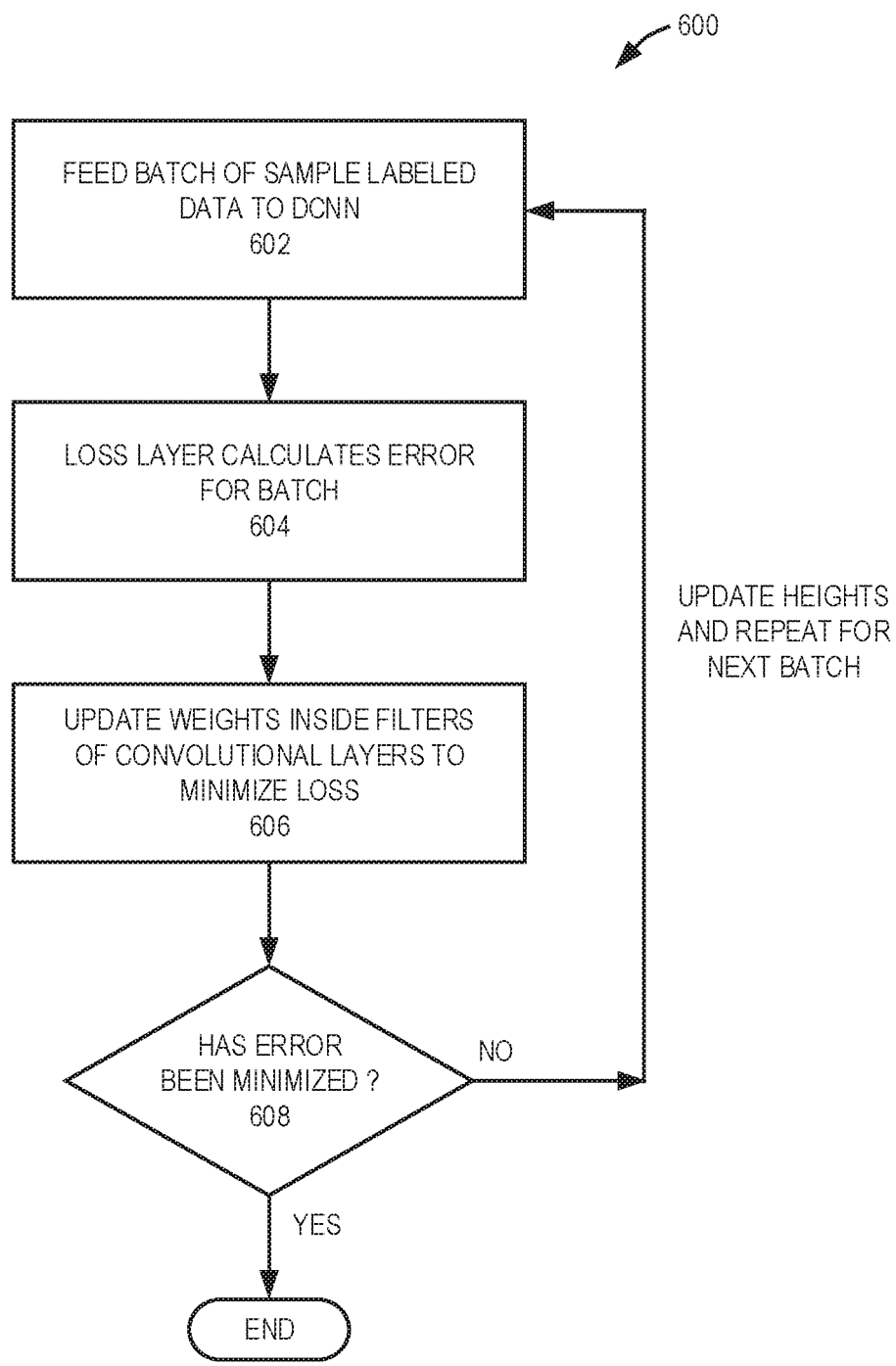
FIG. 6 is a flow diagram illustrating a method of training a DCNN, in accordance with an example embodiment.

As described above, the process of training the DCNN 500 includes a number of different operations. FIG. 6 is a flow diagram illustrating a method 600 of training a DCNN 500, in accordance with an example embodiment. At operation 602, a batch of sample labeled data are fed to the DCNN 500 and the current model of the DCNN 500 produces an output. This output may be, for example, a score for each sample labeled datum. At operation 604, the loss layer 514 of the DCNN 500 calculates the error for the batch of sample data. This error may be, for example, a combination of the individual errors for each of the individual sample labeled data. At operation 606, weights inside the filters in the convolutional layers 504A, 504B (which also include the classification layer 512) are updated to minimize the loss, in accordance with the loss function defined in the loss layer 514. At operation 608, it is determined if the error has been minimized, based on a defined validation set. This defined validation set may include an error threshold, and if that error threshold has been transgressed, then the error has not been minimized and the process repeats back to operation 602 for the next batch of sample labeled images. If the error has been minimized (the threshold has not been transgressed), then the DCNN has been trained.

In an example embodiment, the defined validation set is based on a stochastic gradient descent (SGD) function. SGD comprises the following steps:

1. Randomly select a small number of samples from the training set;
2. Feed the selected samples through all the layers 506-512 in the DCNN 500 until the current error is calculated for each feature map 506A-506C;
3. Update the weights in the convolutional layer 506 with a gradient descent rule:

$$w_{new} = w_{old} - \alpha \nabla \text{error}(w_{old})$$

where w is the weight.

In an example embodiment, position bias is addressed by introducing an inverse propensity weight into a loss function used to train a machine-learned model. This inverse propensity weight essentially increases the weight of candidates in the training data that were presented lower in a list of candidates. This achieves the benefit of counteracting the position bias and increases the effectiveness of the machine-learned model in generating scores for future candidates.

In a further example embodiment, a function is generated for the inverse propensity weight based on responses to contact requests from recruiters. In other words, while the machine learned-model may factor in both the likelihood that a recruiter will want to contact a candidate and the likelihood that a candidate will respond to such a contact, the function generated for the inverse propensity weight will be based only on training data where the candidate actually responded to a contact. This is accomplished by examining the training data for responses by candidates to recruiter contacts. In some example embodiments, responses are known as "accepts" because a recruiter's attempt to contact a candidate is generated as a request to accept a communication from the candidate and a successful response would be for the candidate to accept such a communication. There may, however, be other ways to measure successful contact requests.

Figure 7:
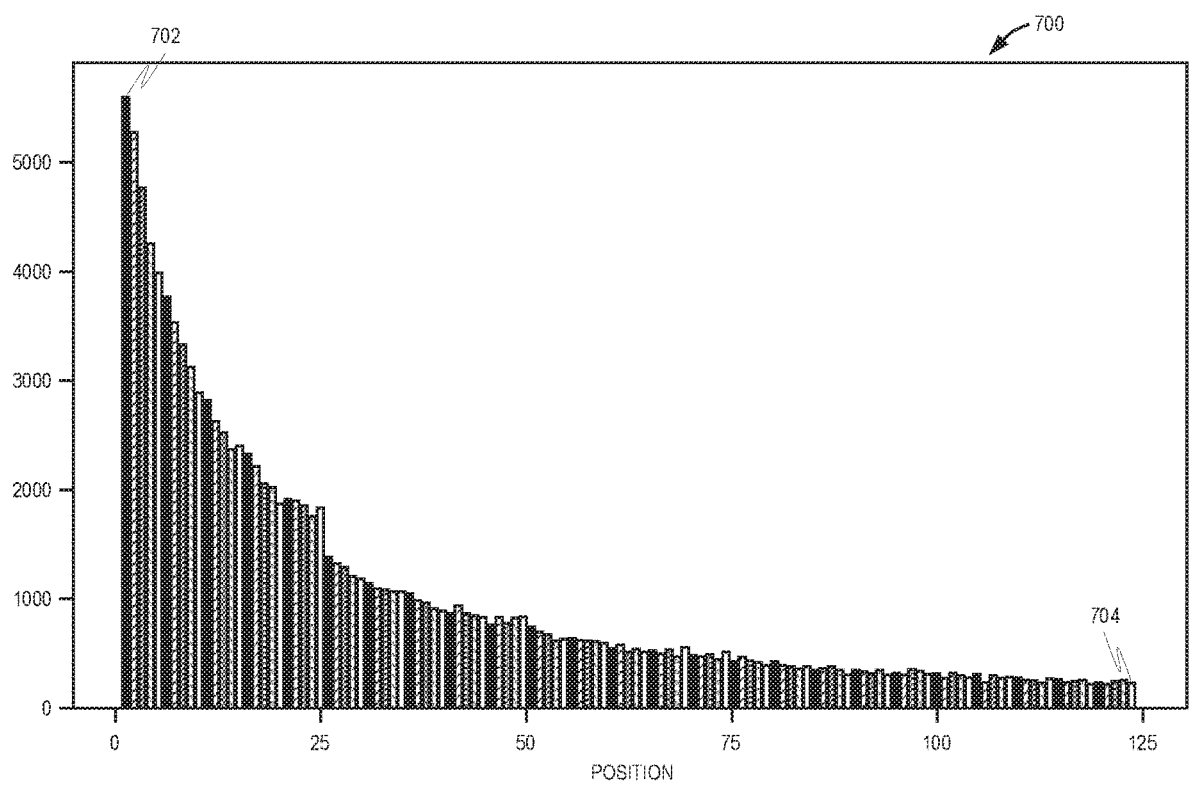
FIG. 7 is a graph illustrating the total number of responses by candidates at each position, in accordance with an example embodiment.

FIG. 7 is a graph 700 illustrating the total number of responses by candidates at each position, in accordance with an example embodiment. As can be seen, the number of responses by candidates at the first position 702 is quite high in comparison to the total number of responses by candidates at the last position 704, This reflects the position bias.

Figure 8:
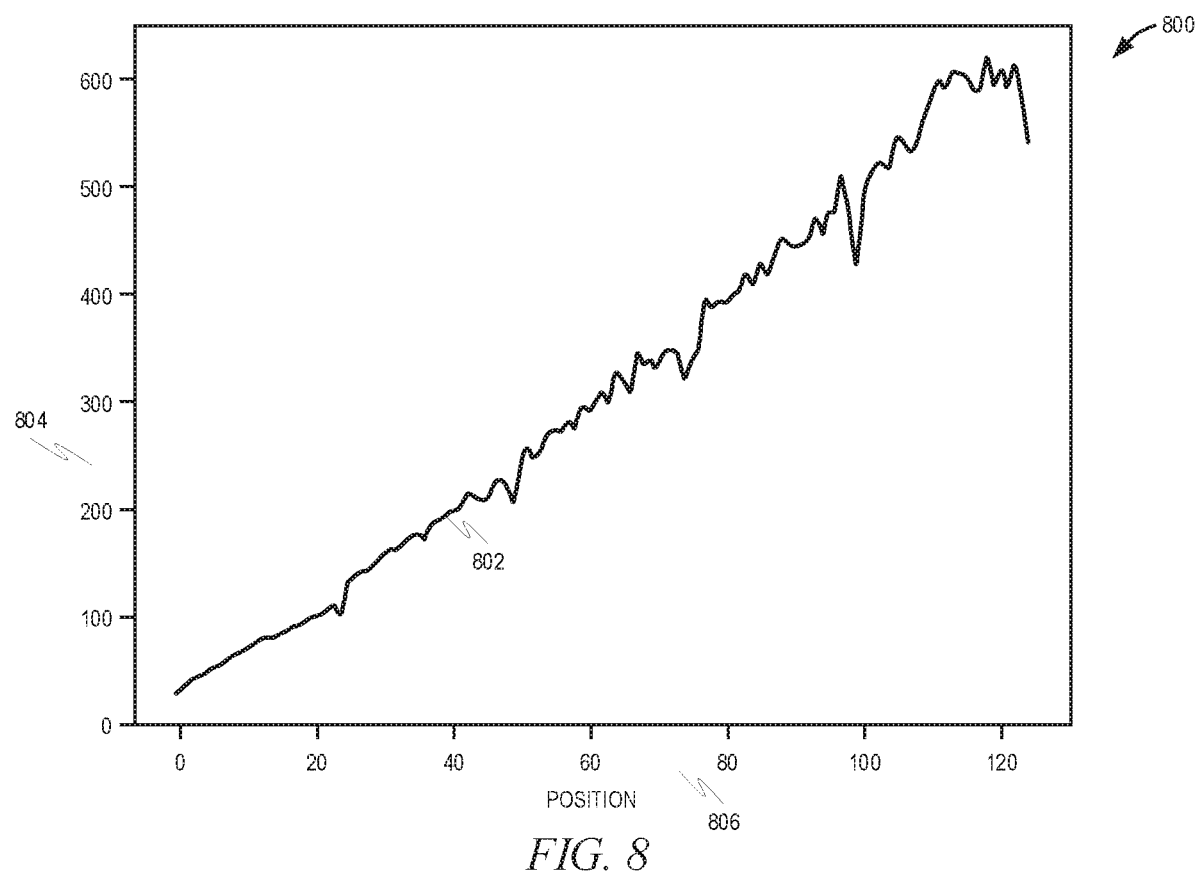
FIG. 8 is a graph illustrating output of an inverse propensity weight function, in accordance with an example embodiment.

The position bias is estimated based on this training data and specifically based on the total number of responses by candidates at each position. An inverse propensity weight function is then generated using this estimation of position bias. FIG. 8 is a graph 800 illustrating output 802 of an inverse propensity weight function, in accordance with an example embodiment. As can be seen, the output 802 generally indicates an increase in the weight 804 as the position 806 increases, with some spots where there are slight drops.

One technical problem that may be introduced is that, unlike other areas which use machine-learned models to rank items of interest, the number of matching search results in a recruiter-candidate model can vary wildly. For example, if the items being ranked were web pages, the typical number of returned web pages in response to a web search are usually in the hundreds of thousands or millions. In contrast, when looking for a candidate, a recruiter may wind up with far fewer search results and that number can vary wildly from search to search. A search for candidates for one position may result in only 10 potential candidates to contact whereas a search for candidates for another position may result in 1250 potential candidates contact.

In order to address this problem, in a further example embodiment, the function generated for the inverse propensity weight is applied only to candidates within a first preset number of candidates in a candidate list/ranking. A different function is generated for candidates after that first preset number of candidates. That different function is based on something other than the total number of responses by candidates at each position. This different function may be a modeled curve that attempts to fit to a curve generated by the function applied to the first preset number of candidates. In another example embodiment, this different function is a flat function beginning at a value generated for the inverse propensity weight for a last candidate of the first preset number of candidates.

Figure 9:
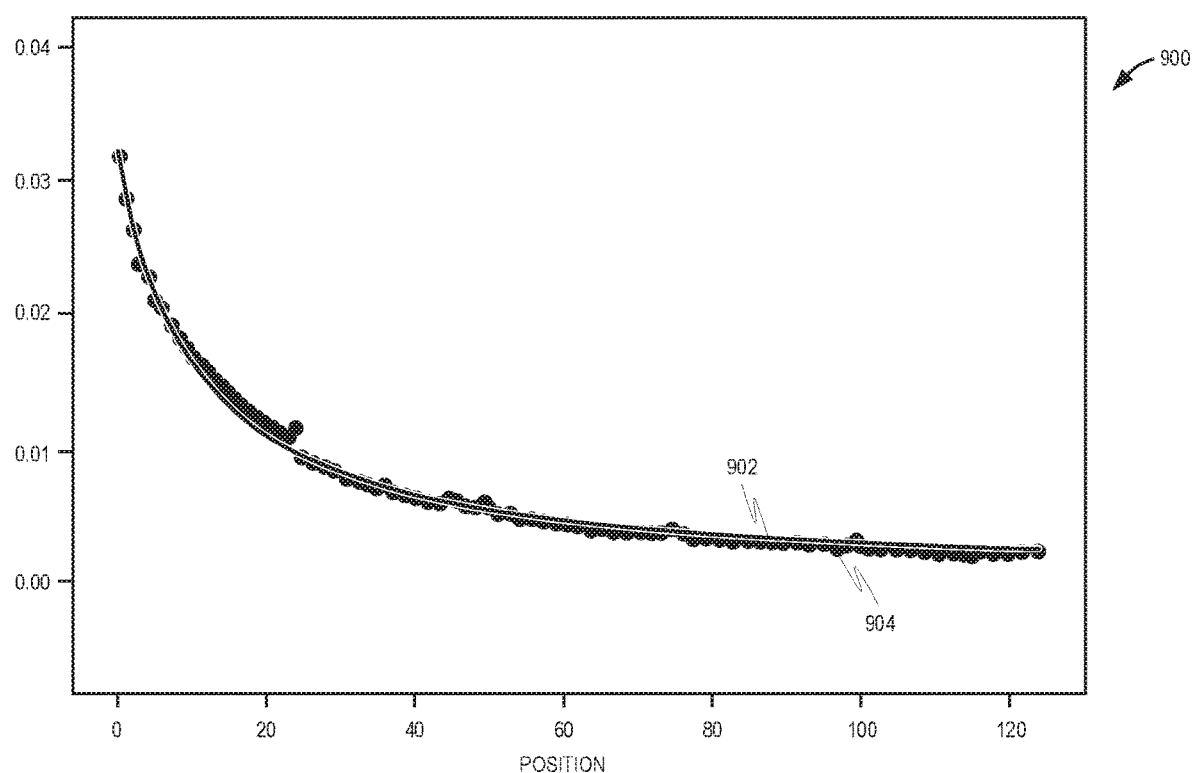
FIG. 9 is a graph showing an embodiment using two different functions to generate inverse propensity weights, in accordance with an example embodiment.

FIG. 9 is a graph 900 showing an embodiment using two different functions to generate inverse propensity weights, in accordance with an example embodiment. Here, the first function 902 is applied to candidates 1-125 whereas the second function 904 is applied to candidates 126 and up. As can be seen, the second function 904 in this case attempts to fit to the curve formed by the first function 902.

Figure 10:
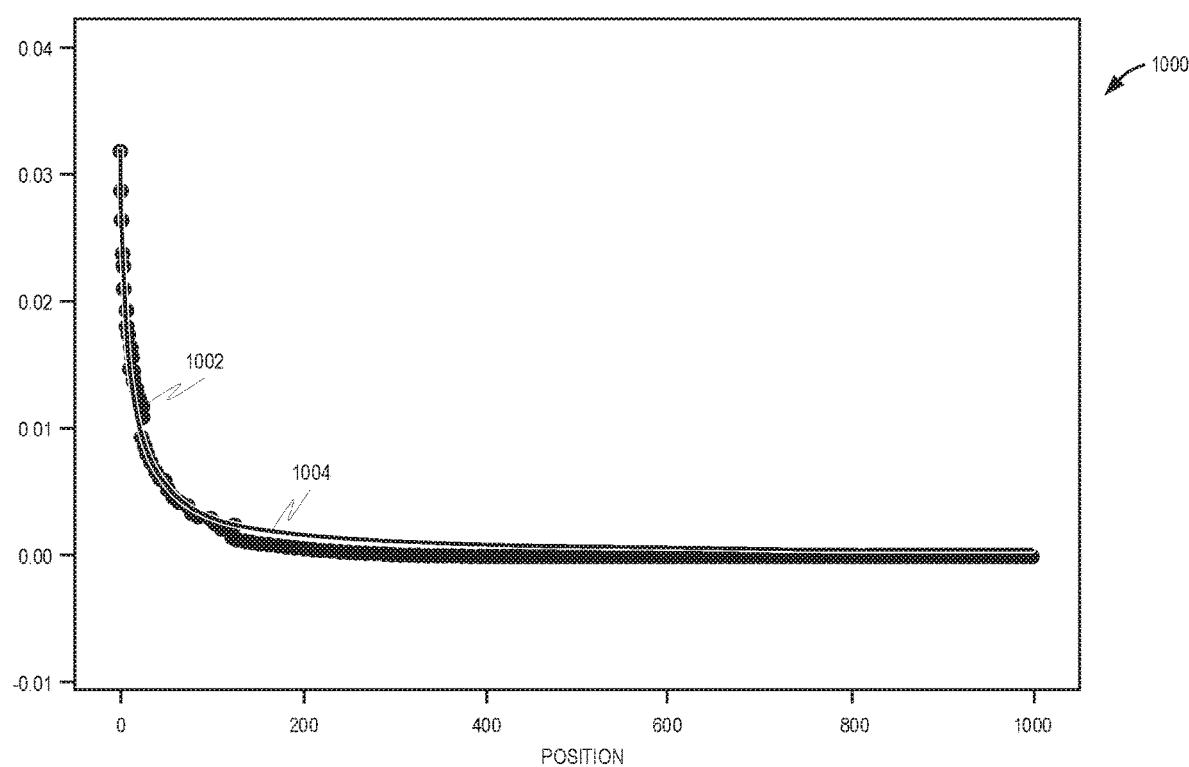
FIG. 10 is a graph showing another embodiment using two different functions to generate inverse propensity weights, in accordance with an example embodiment.

FIG. 10 is a graph 1000 showing another embodiment using two different functions to generate inverse propensity weights, in accordance with an example embodiment. Here, the first function 1002 is applied to candidates 1-125 whereas the second function 1004 is applied to candidates 126 and up. As can be seen, the second function 1004 is flat, beginning at the value applied by the first function 1000 to candidate 125.

Once the inverse propensity weight function(s) are generated, they are applied to a loss function during a training process of the machine-learned model 412. The result is that the machine-learned model is trained in a manner that compensates for the position bias.

Figure 11:
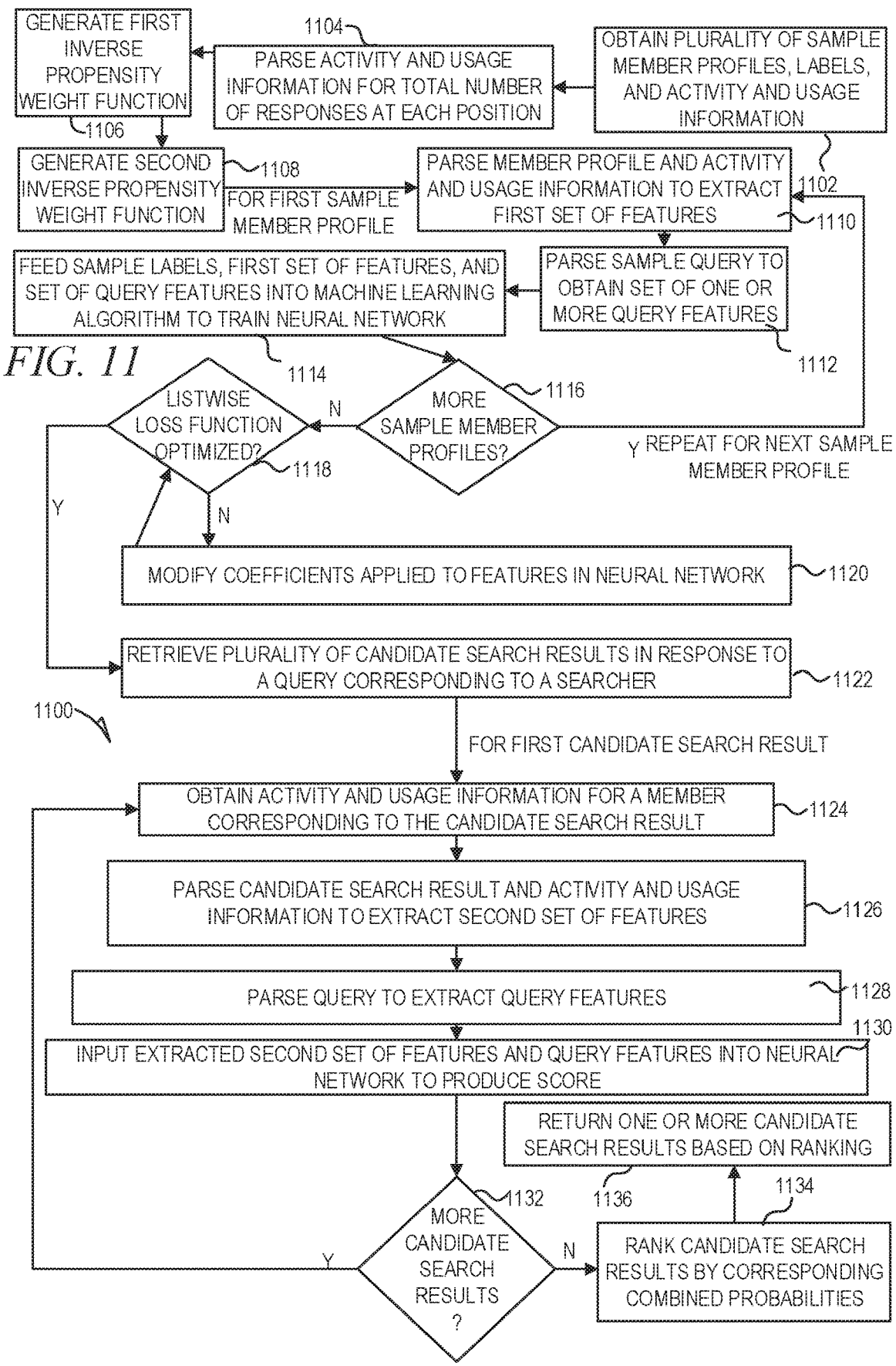
FIG. 11 is a flow diagram illustrating a method for returning search results in an online computer system, in accordance with an example embodiment.

FIG. 11 is a flow diagram illustrating a method 1100 for returning search results in an online computer system, in accordance with an example embodiment. In a training phase, at operation 1102, a plurality of sample member profiles of members of the online service are retrieved along with a plurality of sample member labels and activity and usage information pertaining to actions taken by those members on the online service. At operation 1104, the activity and usage information is parsed to determine a total number of responses generated by members (e.g., candidates) in response to communication requests from other members (e.g., recruiters) at each position in a ranking of returned member profiles. At operation 1106, a first inverse propensity weight function is generated from the total number of responses generated by members at each position in the ranking of returned member profiles. This first inverse propensity weight function is to be applied to a first preset number of returned results. At operation 1108, a second inverse propensity weight function is generated from something other than the total number of responses generated by members at each position in the ranking. This second inverse propensity weight function is to be applied to results other than the first preset number of returned results.

Then a loop is begun for each member profile in the plurality of sample member profiles. At operation 1110, the sample member profile and the activity and usage information pertaining to actions taken by that member on the online service are parsed to extract a first set of features. At operation 1112, a query is parsed to extract a set of one or more query features. Then, at operation 1114, sample member labels, the extracted first set of features and set of one or more query features are fed into a first machine learning algorithm to train the machine-learned model to output scores reflective of a probability that a searcher will select a potential search result corresponding to the first sample member profile and a probability that a member corresponding to the first sample member profile will respond to a communication from a searcher. At operation 1116, it is determined if there are more sample member profiles in the plurality of sample member profiles. If so, then the method 1100 loops back to operation 1110 for the next sample member profile.

If not, then at operation 1118 a listwise loss function is evaluated, using the outputted scores from operation 1108 and the first and second inverse propensity weight functions, to determine if the listwise loss function has been optimized. If not, then at operation 1120, coefficients applied to values of features by the machine-learned model are modified and the method 1100 repeats to operation 1118.

Once the listwise loss function has been optimized, the training phase is complete and a runtime phase begins. At operation 1122, a plurality of candidate search results is retrieved in response to a query corresponding to a searcher. Then a loop is begun for each candidate search result in the plurality of candidate search results. At operation 1124, activity and usage information for a member corresponding to the candidate search result is obtained. At operation 1126, the candidate search result and the activity and usage information for the member are parsed to extract a second set of one or more features. At operation 1128, the query is parsed to extract a set of one or more query features. At operation 1130, the extracted sets of features are fed into the machine-learned model, which outputs a score. At operation 1132, it is determined if there are any more candidate search results in the plurality of candidate search results. If so, then the method 1100 loops back to operation 1124 for the next candidate search result.

If not, then at operation 1134, the plurality of candidate search results are ranked by their corresponding combined probabilities. At operation 1136, one or more of the plurality of candidate search results are returned based on the ranking.

Figure 12:
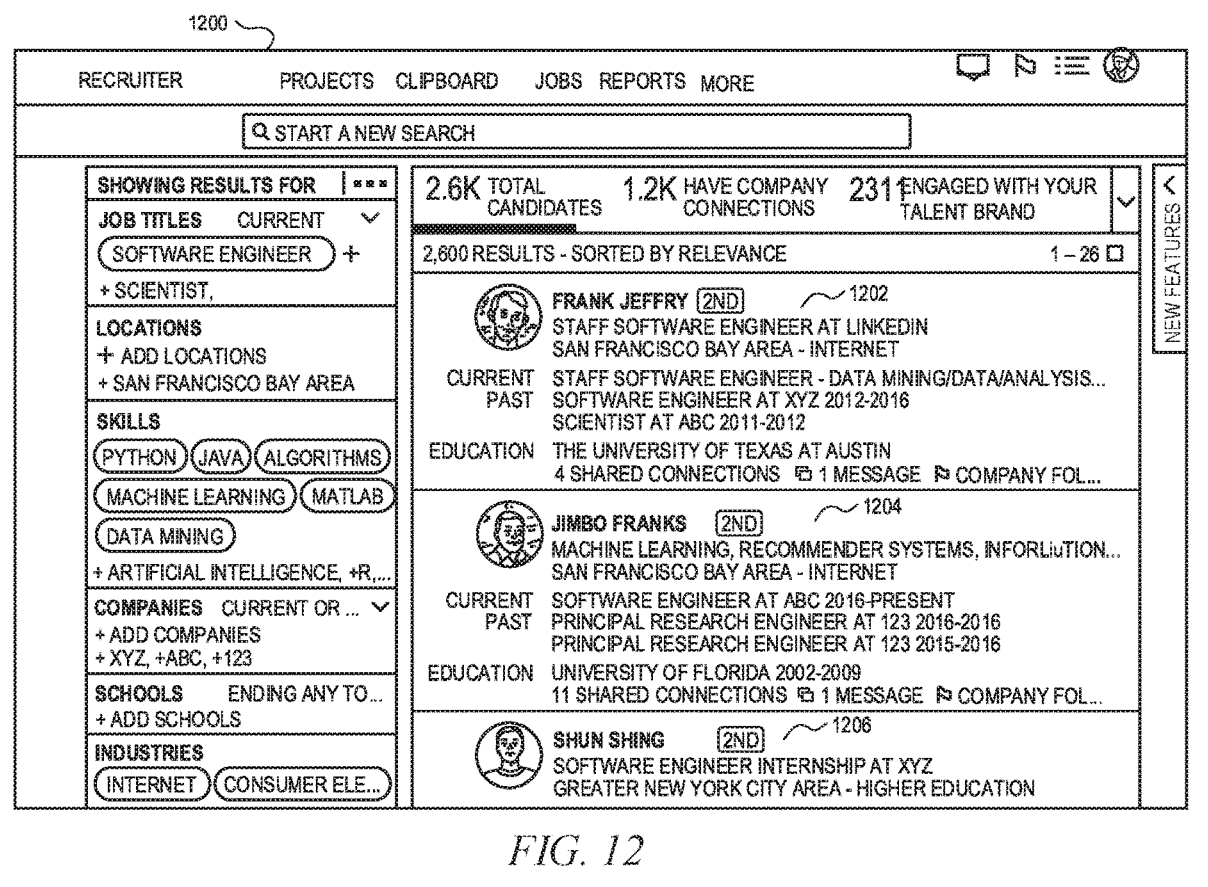

FIG. 12 is a screen capture illustrating a graphical user interface 1200 for displaying results of the ranking performed in FIG. 11. Here, one or more candidates 1202, 1204, 1206 are rendered graphically in order of the ranking.

Figure 13:
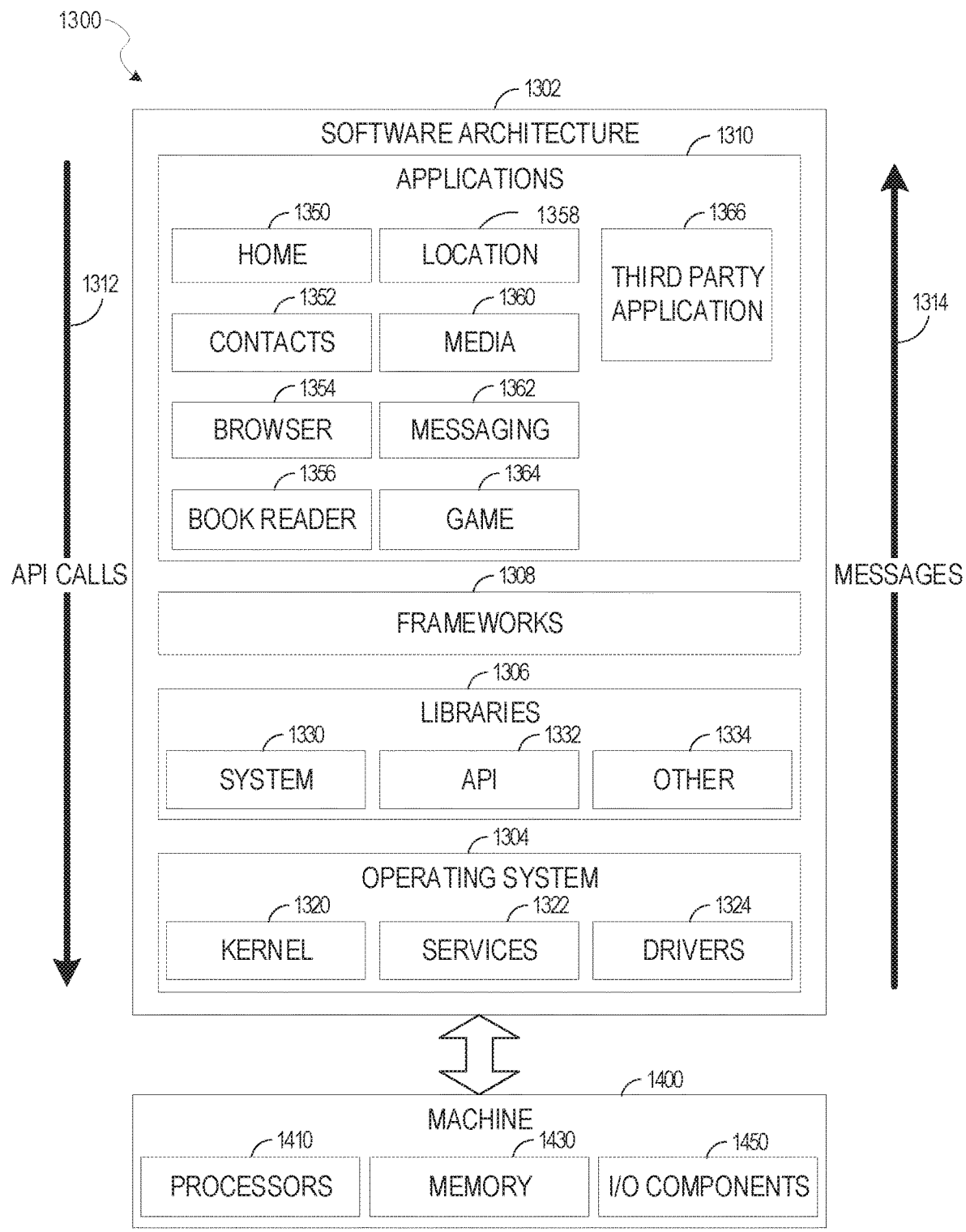
FIG. 13 is a block diagram illustrating an architecture of software, which can be installed on any one or more of the devices described above.

FIG. 13 is a block diagram 1300 illustrating an architecture of software 1302, which can be installed on any one or more of the devices described above. FIG. 13 is merely a non-limiting example of a software architecture, and it will be appreciated that many other architectures can be implemented to facilitate the functionality described herein. In various embodiments, the software 1302 is implemented by hardware such as a machine 1400 of FIG. 14 that includes processors 1410, memory 1430, and input/output (I/O) components 1450. In this example architecture, the software 1302 can be conceptualized as a stack of layers where each layer may provide a particular functionality. For example, the software 1302 includes layers such as an operating system 1304, libraries 1306, frameworks 1308, and applications 1310. Operationally, the applications 1310 invoke API calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system or platform.

In an example embodiments, the applications 1310 include a home application 1350, a contacts application 1352, a browser application 1354, a book reader application 1356, a location application 1358, a media application 1360, a messaging application 1362, a game application 1364, and a broad assortment of other applications such as a third-party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1366 can invoke the API calls 1312 provided by the operating system 1304 to facilitate functionality described herein.

Figure 14:
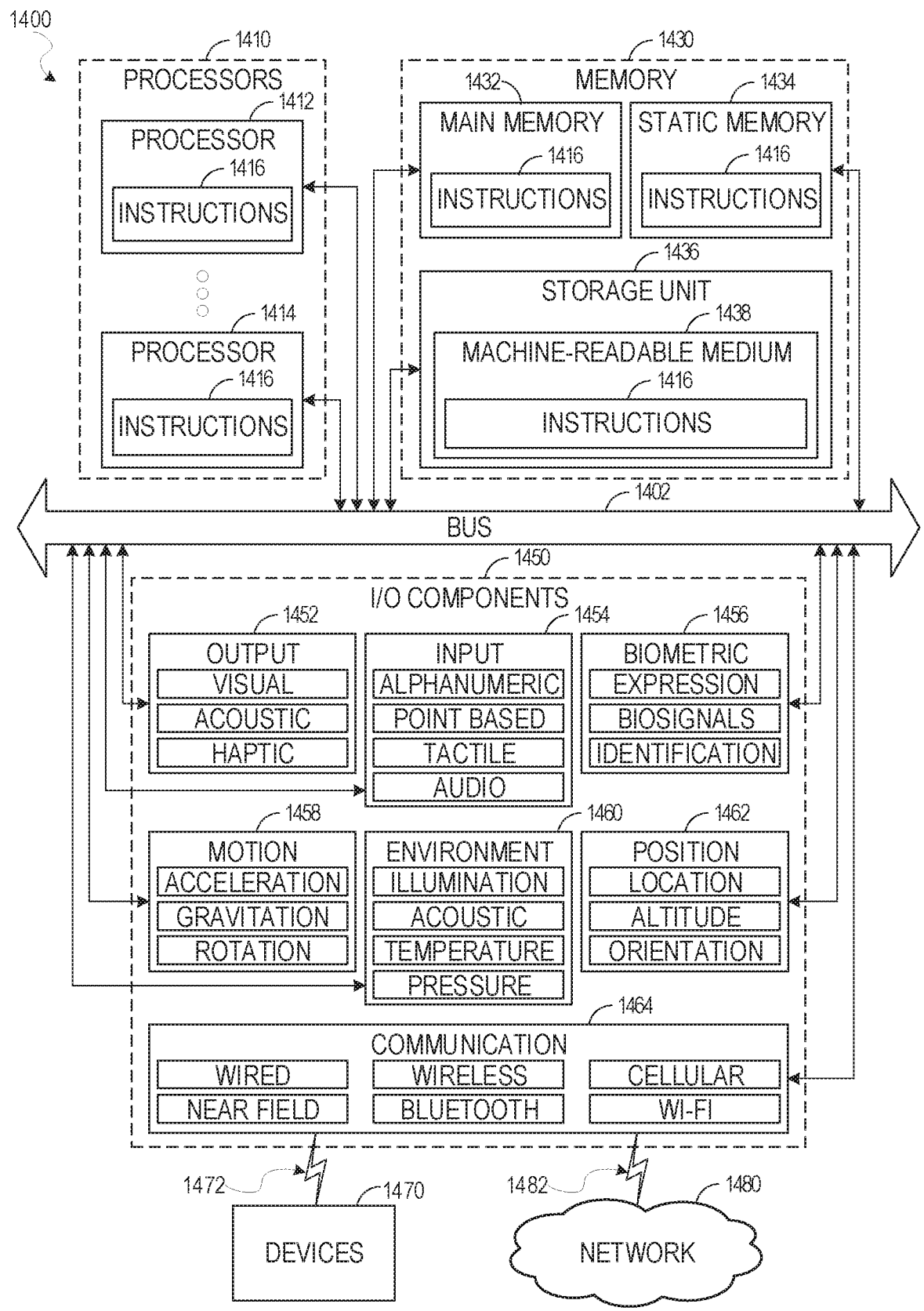
FIG. 14 illustrates a diagrammatic representation of a machine in the form of a computer system within which a set of instructions may be executed for causing the machine to perform any one or more of the methodologies discussed herein, according to an example embodiment.

FIG. 14 illustrates a diagrammatic representation of a machine 1400 in the form of a computer system within which a set of instructions may be executed for causing the machine to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example the instructions 1416 may cause the machine 1400 to execute the method 508 of FIG. 8. Additionally, or alternatively, the instructions 1416 may implement FIGS. 1-6 and 11-12 and so forth. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory 1430 may include a main memory 1432, a static memory 1434, and a storage unit 1436, all accessible to the processors 1410 such as via the bus 1402. The main memory 1430, the static memory 1434, and storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1430, 1432, 1434, and/or memory of the processor(s) 1410) and/or storage unit 1436 may store one or more sets of instructions and data structures (e.g., software) embodying or utilized by any one or more of the methodologies or functions described herein. These instructions (e.g., the instructions 1416), when executed by processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1480 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G; fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system for returning member profiles in an online computer system, the system comprising:
    a computer readable medium having instructions stored there on, which, when executed by a processor, cause the system to:
    access training data, the training data comprising (1) data regarding queries performed for member profiles; (2) data regarding selections by members of ranked member profiles returned in response to the queries, (3) data regarding responses generated by members who received communication requests generated by the selections, (4) member labels associated with the ranked member profiles, and (5) activity and usage information pertaining to actions taken in an online service by members corresponding to the ranked member profiles;
    for each member profile in the training set:
        parse the member profile and the activity and usage information to extract a first set of one or more features;
        parse a search query, associated in the training data with the member profile to extract a first set of one or more query features;
    feed the member labels, the extracted first set of one or more features and the extracted one or more search query features into a first machine learning algorithm to train a machine-learned model to output a score indicative of a probability that a searcher will select a potential search result corresponding to the member profile and a probability that a member corresponding to the member profile will respond to a communication from a searcher, the training including using a first inverse propensity weight function to evaluate a loss function, the inverse propensity weight function calculating, for a first member profile in the training set, a weight based on position of the first member profile in the ranked member profiles, and multiplying the weight by a total number of responses received in response to communication requests generated from selection of the first member profile.

2. The system of claim 1, wherein the instructions further cause the system to:
    obtain a plurality of search results in response to a search query corresponding to a searcher;
    for each search result from the plurality of search results:
        obtain activity and usage information for a member corresponding to the search result;
        parse the search result and the activity and usage information for the member corresponding to the search result to extract a second set of one or more features;
        parse the search query to obtain one or more search query features;
    feed the extracted second set of one or more features and one or more search query features into the machine-learned model, outputting a score for the search result;
    rank the plurality of search results by their corresponding scores; and
    return one or more of the plurality of search results based on the ranking.

3. The system of claim 1, wherein the first inverse propensity weight function is generated only for ranks in the ranking higher than or equal to a preset rank; and
    wherein instructions further comprise:
        generating a second inverse propensity weight function, for ranks in the ranking lower than the preset rank, from a metric other than the total number of responses generated by members in response to communication requests from other members, at each rank in a ranking of member profiles; and wherein the training further uses the second inverse propensity weight function to evaluate the loss function.

4. The system of claim 3, wherein the second inverse propensity weight function is generated by modeling a curve to fit a curve generated by the first inverse propensity weight function.

5. The system of claim 3, wherein the second inverse propensity weight function assigns a weight, to all ranks in the ranking lower than the preset rank, that is equal to a weight assigned by the first inverse propensity weight function to the rank the ranking equal to the preset rank.

6. The system of claim 1, wherein the machine-learned model is a deep neural network.

7. The system of claim 1, wherein the machine-learned model is a convolutional neural network.

8. The system of claim 1, wherein the member profiles contain employment details for users.

9. A computer-implemented method for returning search results in an online computer system, the method comprising:

accessing training data, the training data comprising (1) data regarding queries performed for member profiles; (2) data regarding selections by members of ranked member profiles returned in response to the queries, (3) data regarding responses generated by members who received communication requests generated by the selections, (4) member labels associated with the ranked member profiles, and (5) activity and usage information pertaining to actions taken in an online service by members corresponding to the ranked member profiles;

for each member profile in the training set:
parsing the member profile and the activity and usage information to extract a first set of one or more features;
parsing a search query, associated in the training data with the member profile to extract a first set of one or more query features;

feeding the member labels, the extracted first set of one or more features and the extracted one or more search query features into a first machine learning algorithm to train a machine-learned model to output a score indicative of a probability that a searcher will select a potential search result corresponding to the member profile and a probability that a member corresponding to the member profile will respond to a communication from a searcher, the training including using a first inverse propensity weight function to evaluate a loss function, the inverse propensity weight function calculating, for a first member profile in the training set, a weight based on position of the first member profile in the ranked member profiles, and multiplying the weight by a total number of responses received in response to communication requests generated from selection of the first member profile.

10. The method of claim 9, further comprising:
obtaining a plurality of search results in response to a search query corresponding to a searcher;
for each search result from the plurality of search results:
obtaining activity and usage information for a member corresponding to the search result;
parsing the search result and the activity and usage information for the member corresponding to the search result to extract a second set of one or more features;
parsing the search query to obtain one or more search query features;
feeding the extracted second set of one or more features and one or more search query features into the machine-learned model, outputting a score for the search result;
ranking the plurality of search results by their corresponding scores; and
returning one or more of the plurality of search results based on the ranking.

11. The method of claim 9, wherein the first inverse propensity weight function is generated only for ranks in the ranking higher than or equal to a preset rank; and
wherein the method comprises:
generating a second inverse propensity weight function, for ranks in the ranking lower than the preset rank, from a metric other than the total number of responses generated by members in response to communication requests from other members, at each rank in a ranking of member profiles; and
wherein the training further uses the second inverse propensity weight function to evaluate the loss function.

12. The method of claim 11, wherein the second inverse propensity weight function is generated by modeling a curve to fit a curve generated by the first inverse propensity weight function.

13. The method of claim 11, wherein the second inverse propensity weight function assigns a weight, to all ranks in the ranking lower than the preset rank, that is equal to a weight assigned by the first inverse propensity weight function to the rank the ranking equal to the preset rank.

14. The method of claim 9, wherein the machine-learned model is a deep neural network.

15. The method of claim 9, wherein the machine-learned model is a convolutional neural network.

16. A non-transitory machine-readable storage medium comprising instructions, which when implemented by one or more machines, cause the one or more machines to perform operations comprising:

accessing training data, the training data comprising (1) data regarding queries performed for member profiles; (2) data regarding selections by members of ranked member profiles returned in response to the queries, (3) data regarding responses generated by members who received communication requests generated by the selections, (4) member labels associated with the ranked member profiles, and (5) activity and usage information pertaining to actions taken in an online service by members corresponding to the ranked member profiles;

for each member profile in the training set:
parsing the member profile and the activity and usage information to extract a first set of one or more features;
parsing a search query, associated in the training data with the member profile-to extract a first set of one or more query features;

feeding the member labels, the extracted first set of one or more features and the extracted one or more search query features into a first machine learning algorithm to train a machine-learned model to output a score indicative of a probability that a searcher will select a potential search result corresponding to the member profile and a probability that a member corresponding to the member profile will respond to a communication from a searcher, the training including using a first inverse propensity weight function to evaluate a loss function, the inverse propensity weight function calculating, for a first member profile in the training set, a weight based on position of the first member profile in the ranked member profiles, and multiplying the weight by a total number of responses received in response to communication requests generated from selection of the first member profile.

17. The non-transitory machine-readable storage medium of claim 16, wherein the instructions further cause the system to:
 obtaining a plurality of search results in response to a search query corresponding to a searcher;
 for each search result from the plurality of search results:
  obtaining activity and usage information for a member corresponding to the search result;
  parsing the search result and the activity and usage information for the member corresponding to the search result to extract a second set of one or more features;
  parsing the search query to obtain one or more search query features;
  feeding the extracted second set of one or more features and one or more search query features into the machine-learned model, outputting a score for the search result;
 ranking the plurality of search results by their corresponding scores; and
 returning one or more of the plurality of search results based on the ranking.

18. The non-transitory machine-readable storage medium of claim 16, wherein the first inverse propensity weight function is generated only for ranks in the ranking higher than or equal to a preset rank; and
 wherein instructions further comprise:
  generating a second inverse propensity weight function, for ranks in the ranking lower than the preset rank, from a metric other than the total number of responses generated by members in response to communication requests from other members, at each rank in a ranking of member profiles; and
  wherein the training further uses the second inverse propensity weight function to evaluate the loss function.

19. The non-transitory machine-readable storage medium of claim 18, wherein the second inverse propensity weight function is generated by modeling a curve to fit a curve generated by the first inverse propensity weight function.

20. The non-transitory machine-readable storage medium of claim 18, wherein the second inverse propensity weight function assigns a weight, to all ranks in the ranking lower than the preset rank, that is equal to a weight assigned by the first inverse propensity weight function to the rank the ranking equal to the preset rank.

\* \* \* \* \*